United States Patent Office
3,171,740
Patented Mar. 2, 1965

3,171,740
PROCESS FOR THE PRODUCTION OF COLORED PHOTOGRAPHIC NON - TRANSPARENT OR TRANSPARENT IMAGES
Karl-Heinz Menzel, Cologne-Mulheim, Rolf Pütter, Dusseldorf, and Gerhard Wolfrum, Opladen, Germany, assignors to Agfa Aktiengesellschaft, Leverkusen, Germany, a corporation of Germany
No Drawing. Filed Feb. 9, 1961, Ser. No. 88,035
Claims priority, application Germany, Feb. 11, 1960, A 33,942
9 Claims. (Cl. 96—22)

The present invention relates to a process for the production of color photographic images, more especially color photographic multi-layer images, by means of chromogenic development. As known, such colored images are formed of three component color images, the image dyestuffs being so chosen that they absorb in different regions of the spectrum if this is divided into three parts.

For the production of cyan component color images, it is known to use as color couplers compounds which have a phenolic hydroxyl group and a free para position or substituents which can be split off from the para position. Furthermore, it is known to use derivatives of pyrazolone, indazolone or aroyl acetonitriles for the production of magenta component color images.

It has now been found that especially brilliant cyan or magenta-colored component images are obtained if couplable pyrazolo-[1',5':3,2]-quinazolones and/or their substitution products are used as color couplers. These compounds have for example the general tautomeric formulae:

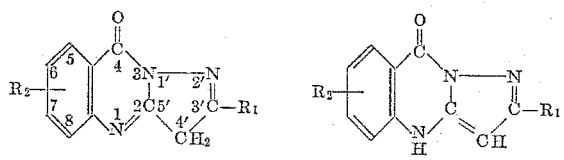

in which $R_1$ is an alkyl, aralkyl, aryl, hydroxy or carboxy radical, it being possible for the hydrogen atoms of these radicals to be substituted, and $R_2$ is a hydrogen, halogen, alkyl, aralkyl, aryl, heterocyclic, hydroxy, alkoxy, substituted or unsubstituted amino, carboxyl or sulpho radical which may be substituted at different positions on the benzene ring.

Furthermore, one or more rings can be linearly or angularly fused to the benzene ring. It is also possible to use compounds which contain several pyrazolo-quinazolone radicals in the molecule.

During color development with known color developers, especially with p-phenylene diamine developers, these couplers form dyestuffs which, according to their substitution, especially in the 3'-position, absorb in the red or green range of the spectrum and are distinguished by very slight secondary absorption. They are consequently excellently suitable for the forming of brilliant positive multi-layer color images which are true in color and are of great value for the formation of negative color images which serve as copying originals for the production of positive color images.

The dyestuffs which form from the color couplers by chromogenic development are not only distinguished by good absorption but are, in addition, completely resistant to acid, i.e., they are not destroyed by acids and also are not changed in color. This distinguishes them from all prior known pyrazolone dyestuffs and also from the cyan dyestuffs derived from phenol and α-hydroxynaphthoic acid. By comparison with the latter dyestuffs, they have the advantage that, in all pH-ranges in sodium sulphite solution, they show neither a reversible nor an irreversible color change or decline. Furthermore, the dyestuffs in most cases show an improved light fastness by comparison with known dyestuffs.

The pyrazolo-quinazolones are produced by condensation of o-amino aroyl hydrazides, e.g., anthranilic acid hydrazide or substitution products thereof with β-dicarbonyl compounds such as the β-oxo-carboxylic acid esters that are described in patent application Serial No. 53,611, filed September 2, 1960, and, if necessary, by subsequent introduction of further substituents, for example, those which improve the water solubility and the resistance to diffusion of the compounds.

According to the aforesaid process a great number of pyrazolo-quinazolones having the foregoing formula are easily obtainable, since o-amino aroyl hydrazides as well as β-oxo-carboxylic acid esters are already known in great number in the literature or can be readily produced according to conventional methods. Thus, for example, for the reaction with β-oxo-carboxylic esters, the hydrazides of anthranilic acid, N-alkyl anthranilic acids, 2,3-amino naphthoic acid, N-alkyl-2,3-amino naphthoic acids, and their derivatives substituted one or more times in the aromatic nucleus, for example, by halogen, alkyl, alkoxy, aryl, phenoxy, amino, acylamino, alkyl amino, carboxyl, sulfonamide, or sulfo radicals or it necessary via bridge members by heterocyclic radicals, may be used. The following β-oxo-carboxylic acid esters may be used, inter alia, acetoacetic acid ethyl ester, acetoacetic acid phenyl ester, acetoacetic acid cyclohexyl ester, acetoacetic acid benzyl ester, stearoylacetic acid ethyl ester, oxalylacetic acid diethyl ester, benzoyl acetic acid ethyl ester, acetone dicarboxylic acid dimethyl ester, and α-methyl acetoacetic acid ethyl ester.

According to the above process it is, furthermore, possible to obtain heterocyclic compounds with several pyrazolo-quinazolone radicals, by starting from aromatic compounds which contain several amino groups and carboxylic acid hydrazide groups standing in ortho positions thereto, the β-oxo-carboxylic acid esters being added in quantities which are at least equivalent to the amino groups. As starting products there come into consideration, for example, aromatic compounds with several benzene nuclei of which each carries one amino radical and carboxylic acid hydrazide radicals in ortho positions thereto, for example, benzidine o,o'-di-carboxylic acid hydrazide.

The new dyestuff components can be used for all processes for the production of color images by chromogenic development and they can in fact be added to the developer solution or to the silver halide layers. Suitable for introduction into the silver halide emulsion layers are those components which contain water-solubilizing groups, such as sulfo radicals or carboxyl radicals, and radicals which improve the resistance to diffusion, such as alkyl radicals containing at least 6 and preferably 10 to 20 carbon atoms. These components can be employed in the form of their water-soluble salts, for example, alkali-metal salts. Alternatively, the components can be introduced into the emulsion layers in dispersed form, preferably in addition to suitable auxiliaries which are known per se for reducing the diffusion power (see U.S. Patents Nos. 2,322,027 and 2,304,940) it being advantageous to employ components which do not contain water-solubilizing groups.

EXAMPLE 1

3'-methyl pyrazolo-quinazolone 37.75 g. of anthranilic acid hydrazide and 32.5 g. of ethyl acetoacetate are stirred into 100 cc. of methanol at room temperature. After one hour, 25 g. of anhydrous sodium carbonate are added and the reaction temperature is kept at 35 to 40° C. After about 30 minutes, the mixture solidifies to form a thick crystal magma, which is filtered off after standing for two hours. It is washed with 100 cc. of methanol at a temperature of 50° C. and then with 200 cc. of hot water. For further purification purposes, the crystal mass is dissolved in 300 cc. of water and 80 cc. of hydrochloric acid ($D=1.19$), clarified with carbon and then a hot solution of 85 g. of the sodium salt of naphthalene-1,5-disulphonic acid in 200 cc. of water is added. After cooling, the precipitated naphthalene disulphonate of 3'-methyl-pyrazoloquinazolone is filtered off. The salt is heated in 1 liter of water and sodium hydroxide solution is added gradually until the reaction mixture is neutral. After suction-filtering and drying, there are obtained about 39 g. of 3'-methyl-pyrazolo-quinazolone, which melts at 365 to 370° C. with decomposition. A normal commercial "Isopan F"-film is exposed behind a grey step wedge and developed in a developer solution having the following composition:

SOLUTION A 3 g. of 3'-methyl-pyrazolo-quinazolone (prepared as described in Example 1) are dissolved in 100 cc. of sodium carbonate solution with 40 cc. of methanol while heating.

SOLUTION B 3 g. of p-diethylaminoaniline sulphate
2 g. of sodium sulphite (anhydrous)
60 g. of sodium carbonate (anhydrous) and
2 g. of potassium bromide are dissolved in about 700 cc. of water. Solution A is combined with solution B and made up to 1000 cc. with water. The procedure thereafter is in accordance with normal color development, i.e. the image is rinsed, bleached and fixed. A magenta-colored image with an absorption maximum at 550 m$\mu$ is obtained.

EXAMPLE 2

3'-methyl-pyrazolo-quinazolone-6-sulphonic acid 49.75 g. of 3'methyl-pyrazolo-quinazolone are introduced at room temperature into 70 cc. of 20 percent oleum (fuming sulphuric acid). The mixture is heated for 1 hour to 110° C., 25 cc. of water are added and the temperature is allowed to rise to 140° C. After one hour, the temperature is lowered to 100° C. and 250 g. of ice are added. The sulphonic acid crystallizes out and is suction-filtered.
Yield: about 50 g.

In order to show the introduction of the sulpho group into the 6-position of the pyrazolo-quinazolone, the infrared absorption spectrum of this substance was compared with the 5-sulpho-anthranilic acid of analogous structure. The absorption bands were identical in the relevant part of the spectrum. This compound is suitable for the production of colored images by the process described in Example 1.

EXAMPLE 3

3'-methyl-8-stearoylamino-pyrazolo-quinazolone-6-sulphonic acid 2 g. of 3'-methyl-8-stearoylaminopyrazoloquinazolone-6-sulfonic acid which is represented by Formula I hereinafter, is suspended in 5 cc. of methanol, dissolved with 5 cc. of 10 percent sodium hydroxide solution and 10 cc. of water and made up with water to 100 cc. The solution is added to 100 cc. of a silver halide emulsion which is cast as a photographic layer on to a support in known manner. After exposure and development, a cyan image with an absorption maximum at 650 m$\mu$ is obtained. For development purposes, a solution having the following composition is used:

Diethylaminoaniline sulphate _____g\_\_ 5
Sodium sulphite (anhydrous) _____g\_\_ 3
Sodium carbonate (anhydrous) _____g\_\_ 80
Potassium bromide _____g\_\_ 3
Water to make 1 litre.

3' - methyl - 8 - stearoylaminopyrazoloquinazolone - 6-sulfonic acid can be produced as follows:

3'-methyl-8-nitropyrazolo-quinazolone-6-sulphonic acid 139 g. of 3'-methyl-pyrazolo-quinazolone-6-sulphonic acid are introduced at 20° C. into 300 cc. of 20 percent fuming sulphuric acid and stirred at room temperature for about five hours until a clear solution is formed. One-half of a mol (=52 cc.) of a mixed acid consisting of 33 percent of $HNO_3$ and 67 percent of $H_2SO_4$ is then added dropwise at 15 to 20° C., the mixture is stirred overnight at 20° C. and then for another 3 hours at 35° C. After cooling to 10° C., the batch is introduced into a mixture of 100 g. of potassium chloride and 2 kg. of ice and the precipitate which forms is suction-filtered after stirring for a short time. The residue is dissolved in 1500 cc. of water. 10 g. of potassium chloride are added to the hot solution and this is suction-filtered after cooling to 10° C. The moist residue is introduced into 400 cc. of concentrated sulphuric acid at 90 to 100° C. and heated for one hour to 150° C. After cooling, ice is added until the volume is 2.5 liters and then suction-filtering is carried out. The residue is again stirred into 600 cc. of water, suction-filtered and finally dried.
Yield: 99 g.

3'-methyl-8-amino-pyrazolo-quinazolone-6-sulphonic acid 20 g. of 3'-methyl-8-nitropyrazolo-quinazolone-6-sulphonic acid are dissolved in 200 cc. of methanol and 50 cc. of 4 percent sodium hydroxide solution. Hydrogenation is carried out in the presence of Raney nickel for 2 hours at 50° C. and 50 atm. After separating from the catalyst, the filtrate is acidified with 4 percent hydrochloric acid, cooled and suction-filtered.
Yield: 10 g.

6 g. of 3'-methyl-8-aminopyrazolo-quinazolone-6-sulphonic acid are dissolved in 100 cc. of dimethylformamide and 25 cc. of pyridine. 8.5 g. of stearic acid chloride are added dropwise at 100° C. and the reaction mixture is stirred for 6 hours at 120° C. The mixture is thereafter poured on to ice and 20 percent hydrochloric acid and suction-filtered. After drying, it is extracted several times with ethyl acetate.
Yield: 6 g.

EXAMPLE 4

3'-m-stearoylaminophenyl-5-chloropyrazolo-quinazolone-6-sulphonic acid 2 g. of 3'-m-stearoylaminophenyl-5-chloropyrazolo-quinazolone-6-sulfonic acid which is represented by Formula II hereinafter, is dissolved, as described in Example 3, cast, exposed and developed. A cyan image is obtained with an absorption maximum at 660 m$\mu$. The compound is prepared as described below:

3'-m-nitrophenyl-5-chloropyrazolo-quinazolone 37 g. of 6-chloranthranilic acid hydrazide and 50 g. of m-nitrobenzoyl acetic ester are heated for 3 hours to 130 to 140° C. 100 cc. of methanol and 200 cc. of 10 percent sodium carbonate solution are then added and the mixture is boiled for 10 hours. After cooling, it is diluted with 250 cc. of water and made neutral with 20 percent hydrochloric acid. The mixture is suction-filtered, washed with water and then is extracted with methanol while hot. After recrystallizing from dimethylformamide, about 40 g. of 3'-m-nitrophenyl-5-chloro-pyrazolo-quinazolone are obtained.
Decomposition point: 400° C.

3'-m-nitrophenyl-5-chloropyrazolo-quinazolone-6-sulphonic acid 20 g. of 3'-m-nitrophenyl - 5 - chloropyrazolo - quinazolone are introduced into 60 g. of 20 percent fuming sulphuric acid and heated for 3 hours to 100° C. 200 cc. of water are added dropwise and the temperature is allowed to rise to 150 to 160° C. It is allowed to cool after 1 hour, when it is suction-filtered and extracted with 200 cc. of methanol.

Yield: about 22 g.

3'-m-aminophenyl-5-chloropyrazolo-quinazolone-6-sulphonic acid 22 g. of 3'-m-nitrophenyl - 5 - chloropyrazolo-quinazolone-6-sulphonic acid are made into a paste with 250 cc. of methanol and adjusted with sodium hydroxide solution to a pH value of 9. The precipitated sodium salt is again dissolved with 700 cc. of water. Hydrogenation is carried out for two hours at room temperature and 50 atm. in the presence of Raney nickel. After filtering off from the catalyst, the filtrate is adjusted with hydrochloric acid to pH 4, diluted with 1 liter of methanol and suction-filtered.

Yield: about 21 g.

8 g. of 3'-m-aminophenyl - 5 - chloropyrazolo-quinazolone-6-sulphonic acid are dissolved in 100 cc. of dimethyl formamide and 20 cc. of pyridine. 7 g. of stearic acid chloride are added dropwise at 80° C., the mixture is heated for 5 hours to 100° C. and the reaction mixture is introduced into a mixture of ice and hydrochloric acid. It is suction-filtered and the dried product is again extracted in the cold with methanol. Approximately 10 g. of product which is represented by Formula II hereinafter are obtained.

EXAMPLE 5

3'-m-stearoylaminophenyl-pyrazolo-quinazolone-6-sulphonic acid

By using 2 g. of 3'-m-stearoylaminophenyl-pyrazoloquinazolone-6-sulfonic acid which is represented by Formula III hereinafter, instead of 3'-methyl-8-stearoylaminopyrazoloquinazolone-6-sulfonic acid and proceeding otherwise as described in Example 3, a cyan image is obtained having an absorption maximum at 655 m$\mu$. 3'-m-stearoylaminophenylpyrazoloquinazolone - 6 - sulfonic acid can be prepared as follows:

3'-m-nitrophenyl-pyrazolo-quinazolone 30 g. of anthranilic acid hydrazide and 50 g. of m-nitrobenzoyl acetic ester are heated for 1 hour to 130° C., whereupon 20 g. of sodium carbonate are added and the mixture is heated for another 5 hours. After adding 100 cc. of methanol, the temperature is raised after 5 hours to 85° C. 200 cc. of water are then added, the mixture is made neutral with 20 percent hydrochloric acid, suction-filtered, thoroughly washed with water and repeatedly extracted by boiling with methanol. A yield of about 40 g. is obtained and the decomposition point is about 400° C.

3'-m-nitrophenyl-pyrazolo-quinazolone-6-sulphonic acid 40 g. of 3'-m-nitrophenyl-pyrazolo-quinazolone are introduced into 120 cc. of 20 percent fuming sulphuric acid and heated for 3 hours to 100° C. 400 cc. of water are carefully added, the temperature being allowed to rise to 160° C. After one hour, it is allowed to cool, and it is suction-filtered and after extracting, by boiling with methanol, a yield of about 40 g. is obtained.

3'-m-aminophenyl-pyrazolo-quinazolone-6-sulphonic acid 40 g. of 3'-m-nitrophenyl-pyrazolo-quinazolone-6-sulphonic acid are dissolved in 300 cc. of methanol and 150 cc. of water. The solution is adjusted to pH of 8 to 9 with sodium hydroxide solution and hydrogenation is carried out in the presence of Raney nickel for 2 hours at room temperature and 50 atm. Thereafter, the solution is separated from the catalyst after heating, the filtrate is made neutral with 20 percent sulphuric acid and then suction-filtered. Yield: 35 g.

21 g. of 3'-m-aminophenyl-pyrazolo-quinazolone-6-sulphonic acid are dissolved in 300 cc. of dimethyl formamide and 90 cc. of triethylamine. 26 g. of stearic acid chloride are added dropwise at 90° C. and the mixture is stirred for 5 hours at this temperature. It is introduced into a mixture of ice and hydrochloric acid, diluted with methanol and suction-filtered. After drying, it is extracted, first of all with acetone and then with petroleum ether.

Yield 30 g. of product which is represented by Formula III.

EXAMPLE 6

3'-p-stearoylaminophenyl-pyrazolo-quinazolone-6-sulphonic acid

When 2 g. of 3'-p-stearoylaminophenyl-pyrazoloquinazolone-6-sulfonic acid which is represented by Formula IV hereinafter, is used instead of 3'-methyl-8-stearoylaminopyrazoloquinazolone-6-sulfonic acid, and proceeding otherwise as described in Example 3, a cyan image is obtained having an absorption maximum at 650 m$\mu$. 3' - p - stearoylaminophenylpyrazoloquinazolone-6-sulfonic acid can be prepared as follows:

3'-p-nitrophenyl-pyrazolo-quinazolone 30 g. of anthranilic acid hydrazide and 50 g. of p-nitrobenzoyl acetic ester are heated for 1 hour to 130° C. 20 g. of sodium carbonate are added and the mixture is further treated as described in Example 5.

Yield: 40 g., decomposition point: 380° C.

3'-p-nitrophenyl-pyrazolo-quinazolone-6-sulphonic acid 40 g. of 3'-p-nitrophenyl-pyrazolo-quinazolone are introduced into 120 cc. of 20 percent fuming sulphuric acid and heated for three hours to 100° C. After adding 400 cc. of water, the temperature is allowed to rise to 150° C. After one hour, the mixture is cooled, suction-filtered and washed with water. After extraction with acetone, a yield of 48 g. is obtained.

3'-p-aminophenyl-pyrazolo-quinazolone-6-sulphonic acid 18 g. of 3'-p-nitrophenyl-pyrazolo-quinazolone-6-sulphonic acid are dissolved in 100 cc. of methanol and 150 cc. of water. The pH value is adjusted to 9 with 10 percent sodium hydroxide solution and hydrogenation is performed in the presence of Raney nickel for two hours at room temperature and 50 atm. After separating out the catalyst, the filtrate is acidified with 20 percent sulphuric acid. The amine crystallizes out and is suction-filtered.

Yield: 14 g.

7 g. of 3'-p-aminophenyl-pyrazolo-quinazolone-6-sulphonic acid are dissolved in 60 cc. of pyridine. At 80° C., 7 g. of stearic acid chloride are added dropwise and the mixture heated for 2 hours to 80–100° C. The reaction mixture is poured on to a mixture of ice and hydrochloric acid and suction-filtered. After drying, it is extracted several times with methanol. Approximately 10 g. of 3'-p-stearoylaminophenylpyrazoloquinazolone-6-sulfonic acid represented by Formula IV hereinafter is obtained.

EXAMPLE 7

3'-heptadecyl-pyrazolo-quinazolone-6-sulphonic acid

By using of 2 g. of 3'-heptadecylpyrazoloquinazolone-6-sulfonic acid which is represented by Formula V hereinafter, instead of 3'methyl-8-stearoylamino-pyrazoloquinazolone-6-sulfonic acid, and proceeding otherwise in a manner analogous to that described in Example 3, a blue image is obtained with an absorption maximum at 630 m$\mu$.

3' - heptadecylpyrazoloquinazolone-6-sulfonic acid can be prepared as follows:

3'-heptadecylpyrazoloquinazolone 15 g. of anthranilic acid hydrazide and 38 g. of stearoylacetic ester are heated in 40 cc. of methanol for 30 minutes to boiling point. 50 cc. of 10 percent sodium carbonate solution are then added and the mixture boiled for another two hours, diluted with some methanol and adjusted to pH 5 with 20 percent hydrochloric acid. It is then suction-filtered and the dry product is extracted by boiling several times with acetone. On recrystallization from methyl glycol, 23 g. of product are obtained, M.P. 120° C.

5 g. of 3'-heptadecyl-pyrazolo-quinazolone are introduced into 15 cc. of 20 percent fuming sulphuric acid and heated for three hours to 100° C. 50 cc. of water are added, the temperature rising to 150° C. After cooling, the mixture is suction-filtered and the dry product extracted several times with acetone.

Yield: 4 g. of 3'-heptadecylpyrazoloquinazolone-6-sulfonic acid which is represented by Formula V.

EXAMPLE 8

3'-carboxy-7-stearoylamino-pyrazolo-quinazolone-6-sulphonic acid

By using 2 g. of 3'-carboxy-7-stearoylaminopyrazoloquinazolone-6-sulfonic acid which is represented by Formula VI hereinafter, instead of 3'-methyl-8-stearoylaminopyrazoloquinazolone - 6 - sulfonic acid, and proceeding otherwise as described in Example 3, a cyan image is obtained with an absorption maximum at 650 m$\mu$. 3'-carboxy - 7 - stearoylaminopyrazoloquinazolone - 6 - sulfonic acid can be prepared as follows:

7-amino-pyrazolo-quinazolone-3'-carboxylic acid 17 g. of 2,4-diaminobenzoic acid hydrazide and 23 g. of sodium oxalylacetic acid are stirred into 200 cc. of water for one hour at 100° C. 10 g. of anhydrous sodium carbonate are added to the solution and heating is continued for another hour to 100° C. After cooling, it is suction-filtered and dried. The dried product is then extracted with 150 cc. of methanol.

Yield: 17–20 g. M.P. 288° C. with decomposition.

3'-carboxy-7-aminopyrazolo-quinazolone-6-sulphonic acid 5 g. of 7-amino-pyrazolo-quinazolone-3'-carboxylic acid are introduced into 20 cc. of 20 percent fuming sulphuric acid, the temperature rising to 80° C. The mixture is stirred for one hour at this temperature and the reaction mixture is poured into ice. It is suction-filtered, extracted by boiling with 100 cc. of methanol, cooled and suction-filtered.

Yield: about 5 g. M.P. with decomposition from 305° C.

4 g. of 3'-carboxyl - 7 - amino-pyrazolo-quinazolone-6-sulphonic acid are dissolved in 30 cc. of dimethylformamide. At 100° C., 5 g. of stearic acid chloride are added dropwise and the mixture is heated for 15 hours to 120° C. It is introduced into a mixture of ice and hydrochloric acid, suction-filtered and extracted in the cold with 200 cc. of methanol.

Yield: 5 g. of 3'-carboxy - 7 - stearoylaminopyrazoloquinazolone-6-sulfonic acid represented by Formula VI.

EXAMPLE 9

3'-hydroxy-7-octadecenyl-succinoylamino-pyrazolo-quinazolone

By using 2 g. of 3'-hydroxy-7-octadecenylsuccinoylaminopyrazoloquinazolone which is represented by Formula VII hereinafter, instead of 3'-methyl-8-stearoylaminopyrazoloquinazolone-6-sulfonic acid, and proceeding otherwise as described in Example 3 a magenta image is obtained with an absorption maximum at 550 m$\mu$.

3' - hydroxy - 7 - octadecenylsuccinoylamino-pyrazoloquinazolone can be prepared as follows:

3'-hydroxy-7-aminopyrazolo-quinazolone 24 g. of iminoether hydrochloride prepared from ethyl cyanoacetate alcohol and hydrogen chloride and 17 g. of 2,4-diaminobenzoic acid hydrazide are heated at the boiling point in 50 cc. of methanol for 30 minutes. 100 cc. of 10 percent sodium carbonate solution are added and the mixture is heated for 2 hours in a steam bath to 100° C. The acidity of the mixture is adjusted until it is acid to Congo red indicator with 100 cc. of 20 percent hydrochloric acid, whereupon the mixture is cooled and suction-filtered. It is extracted by boiling with 100 cc. of methanol.

Yield: 20 g.; M.P. decomposition from 320° C.

2.2 g. of 3'-hydroxy-7-amino-pyrazolo-quinazolone are introduced into 10 cc. of glacial acetic acid and 50 cc. of dimethyl formamide and 4 g. of octadecenylsuccinic acid anhydride are added. The mixture is heated for 12 hours to 70° C., whereupon it is introduced into ice, adjusted to pH of 5 and then it is suction-filtered. It is extracted by boiling with 100 cc. of methanol. About 3.5 g. of 3'-hydroxy-7-octadecenylsuccinoylaminopyrazoloquinazolone represented by Formula VII is obtained.

EXAMPLE 10

Pyrazolo-quinazolone-3'-7-dicarboxylic acid 20 g. of aminoterephthalic acid monohydrazide and 23 g. of sodium oxalylacetic acid are stirred in 100 cc. of water for 6 hours at room temperature. The yellow product which then precipitates redissolves after the mixture is heated on a water bath at 100° C. and after 30 minutes, 25 cc. of concentrated sodium hydroxide solution are added and stirring is continued for 45 minutes at 100° C. After standing over night, the acidity of the mixture is adjusted until it is acid to Congo red indicator with 10 percent hydrochloric acid and the mixture is then suction-filtered. The reaction product is extracted by boiling with 150 cc. of methanol. About 15 g. of pyrazoloquinazolone-3',7-dicarboxylic acid which is represented by Formula VIII hereinafter is obtained.

Melting point with decomposition from 280° C.

When pyrazoloquinazolone-3',7-dicarboxylic acid is substituted for 3'-methylpyrazoloquinazolone and otherwise treated as described in Example 1, it couples to form a cyan dyestuff which absorbs at 670 m$\mu$.

EXAMPLE 11

3'-hydroxy-pyrazolo-quinazolone 150 g. of anthranilic acid hydrazide and 215 g. of iminoether hydrochloride prepared from ethyl cyanoacetate alcohol and hydrogen chloride are heated for 1 hour to 70° C. in 300 cc. of water. 30 g. of anhydrous sodium carbonate are added, the mixture is heated for 1 hour to 70° C., cooled and suction-filtered. After recrystallization from water, about 110 g. of 3'-hydroxypyrazoloquinazolone is obtained having a melting point of 370° C. (absorption maximum 550 m$\mu$). The compound yields a magenta-colored dyestuff image when it is substituted for 3'-methylpyrazoloquinazolone and otherwise treated as described in Example 1.

EXAMPLE 12

3'-ethoxy-pyrazolo-quinazolone 4 g. of 3'-hydroxy-quinazolone are dissolved in 50 cc. of 10 percent sodium hydroxide solution. 3.2 g. of ethyl iodide are added and the mixture is heated for 2 hours at 80° C. The reaction mixture is introduced into a mixture of ice and hydrochloric acid and suction-filtered. After recrystallization from alcohol, about 3 g. 3'-ethoxypyrazoloquinazolone which is represented by Formula IX hereinafter is obtained. The compound couples to form a magenta dyestuff with an absorption maximum at 550 m$\mu$, when it is substituted for 3'-methylpyrazoloquinazolone and otherwise treated as described in Example 1.

It is to be understood that other pyrazolo-quinazolones substituted with various substituents may be used in place of those disclosed in the Examples as color couplers in photographic processes.

Such pyrazolo-quinazolones can be prepared by methods analogous to those described hereinbefore by suitable selection of starting compounds. For example, the compounds represented by Formulae X to XX hereinafter can be prepared as follows:

X by condensation of ethyl phenylacetoacetate with anthranilic acid hydrazide;
XI by condensation of an acetone dicarboxylic acid diethyl ester with anthranilic acid hydrazide;
XII by condensation of a 2-amino-4-methyl benzoic acid hydrazide with ethyl acetoacetate;
XIII by condensation of 3-amino-diphenyl-4-carboxylic acid hydrazide with ethyl acetoacetate;
XIV by condensation of anthranilic acid hydrazide with diethyl oxalylacetate;
XV by condensation of 3-amino-β-naphthoic hydrazide with ethyl acetoacetate;
XVI by condensation of 2-amino-α-naphthoic acid hydrazide with ethyl acetoacetate;
XVII by condensation of anthranilic acid hydrazide with benzoyl acetic acid ester;
XVIII by condensation of 3-amino-diphenylmethane-4-carboxylic acid hydrazide with ethyl acetoacetate;
XIX by condensation of 2-amino-4-hydroxy benzoic acid hydrazide with ethyl acetoacetate;
XX by condensation of 2-amino-4-methoxy benzoic acid hydrazide with ethyl acetoacetate.

TABLE OF FORMULAE

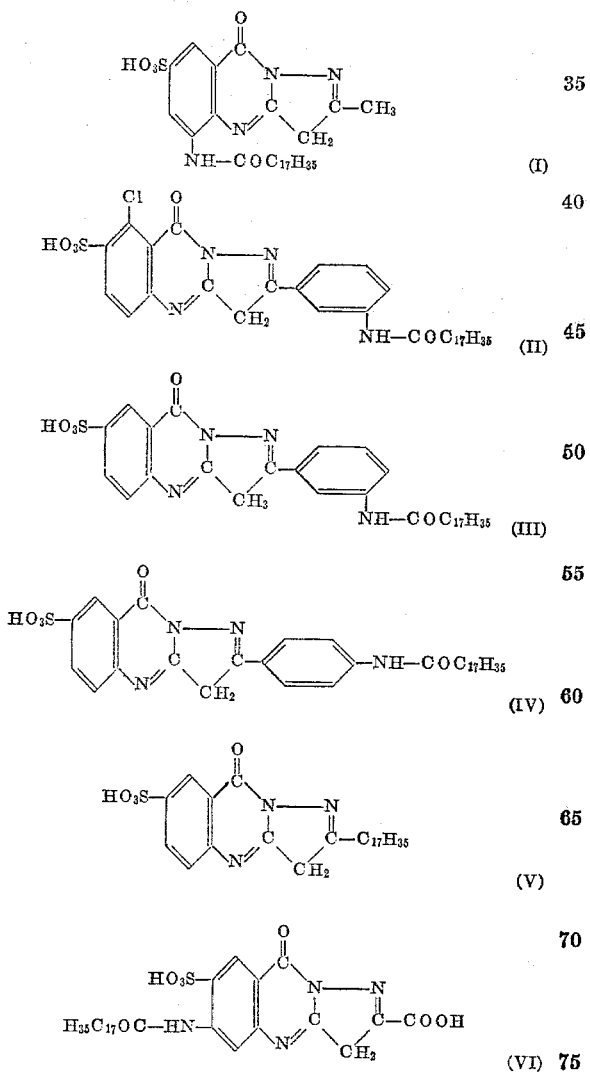

TABLE OF FORMULAE—Continued

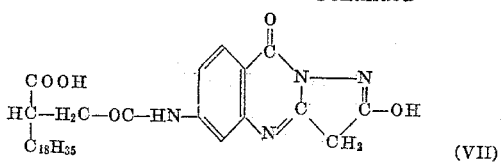

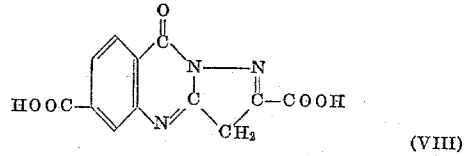

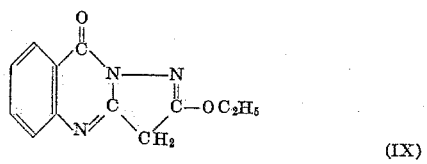

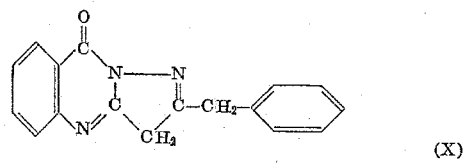

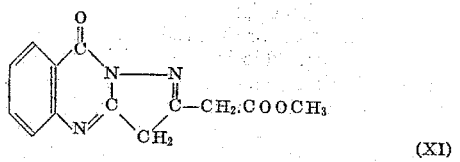

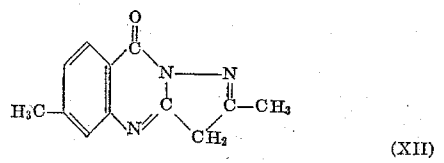

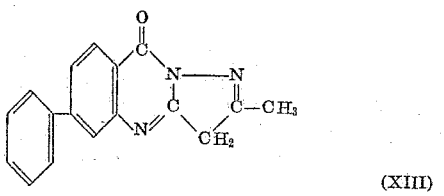

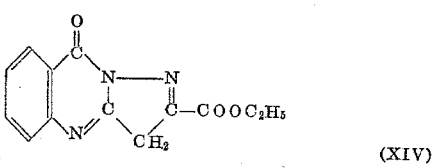

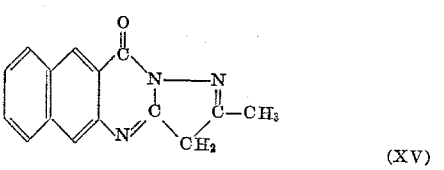

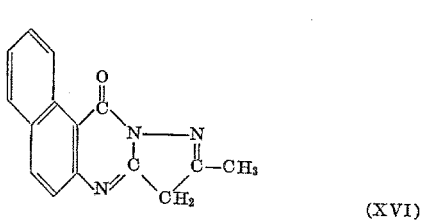

TABLE OF FORMULAE—Continued

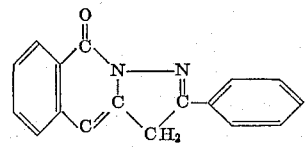

(XVII)

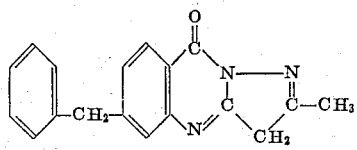

(XVIII)

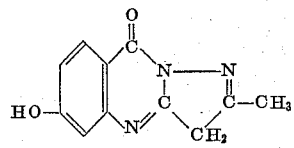

(XIX)

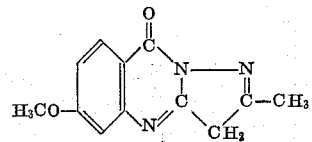

(XX)

What is claimed is:

1. In a process for the production of magenta and cyan-colored photographic images which comprises developing an exposed silver halide emulsion layer with a color-forming developer, the improvement consisting in developing the exposed silver halide emulsion layer in the presence of a color coupler consisting of pyrazolo[1',5':3,2] quinozolone of the group consisting of compounds having the following tautomeric formulae:

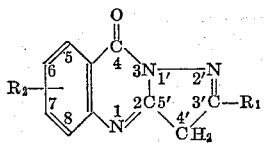 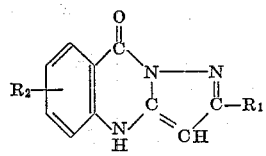

in which $R_1$ is a group consisting of alkyl, phenyl, N-(alkylcarbonyl) aminophenyl, hydroxy, alkoxy, carboxyl and alkoxycarbonyl radicals, and $R_2$ is a group consisting of hydrogen, alkyl, benzyl, phenyl, hydroxy, alkoxy, halogen, amino, alkylcarbonylamino, carboxyl, and sulfo radicals.

2. A process as defined in claim 1 in which the pyrazoloquinazolone color coupler as defined in claim 1 is added to the color developer.

3. A process as defined in claim 1 in which the pyrazoloquinazolone color coupler as defined in claim 1 is incorporated into an emulsion layer.

4. A process as defined in claim 1 in which the color coupler is 3'-methyl-8-stearoylaminopyrazolo[1',5':3,2] quinazolone-6-sulfonic acid.

5. A process as defined in claim 1 in which the color coupler is a 3'-stearoylaminophenylpyrazolo[1',5':3,2] quinazolone-6-sulfonic acid.

6. A process as defined in claim 1 in which the color coupler is 3'-heptadecylpyrazolo[1',5':3,2]quinazolone-6-sulfonic acid.

7. A process as defined in claim 1 in which the color coupler is 3'-carboxy-7-stearoylaminopyrazolo[1',5':3,2] quinazolone-6-sulfonic acid.

8. A process as defined in claim 1 in which the color coupler is 3'-hydroxy-7-octadecenylsuccinoylaminopyrazolo-[1',5':3,2]quinazolone-6-sulfonic acid.

9. A light-sensitive photographic material comprising a silver halide emulsion layer disposed upon a supporting layer which contains a color coupler consisting of a pyrazolo-[1',5':3,2]-quinazolone having the following tautomeric formulae:

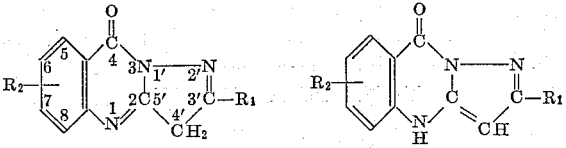

in which $R_1$ is a group consisting of alkyl, phenyl, N-(alkylcarbonyl) amino phenyl, hydroxy, alkoxy, carboxyl and alkoxy-carbonyl radicals and $R_2$ is a group consisting of hydrogen, alkyl, benzyl, phenyl, hydroxy, alkoxy, halogen, amino, alkyl-carbonylamino, carboxyl, and sulfo radicals.

References Cited in the file of this patent

UNITED STATES PATENTS

| | | |
|---|---|---|
| 2,650,924 | Papesch | Sept. 1, 1953 |
| 2,792,397 | Ebel et al. | May 14, 1957 |
| 2,872,317 | Woolley | Feb. 3, 1959 |
| 2,902,366 | Sprung | Sept. 1, 1959 |
| 3,061,432 | Menzel et al. | Oct. 30, 1962 |

OTHER REFERENCES

Evdokimoff: Chemical Abstracts, vol. 55, page 5517, March 20, 1961.